US008434642B2

(12) United States Patent
Rudick

(10) Patent No.: US 8,434,642 B2
(45) **Date of Patent: *May 7, 2013**

(54) METHOD AND APPARATUS FOR PROVIDING A SELECTABLE BEVERAGE

(75) Inventor: Arthur G. Rudick, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,516

(22) Filed: Apr. 4, 2012

(65) Prior Publication Data

US 2012/0223096 A1 Sep. 6, 2012

Related U.S. Application Data

(63) Continuation of application No. 12/171,698, filed on Jul. 11, 2008, now Pat. No. 8,162, 176.

(60) Provisional application No. 60/970,278, filed on Sep. 6, 2007.

(51) Int. Cl.
*G01F 11/00* (2006.01)

(52) U.S. Cl.
USPC ........... 222/1; 222/52; 222/129.1; 222/129.4; 222/132; 222/145.5; 700/231; 700/241

(58) Field of Classification Search ................. 222/1, 129.1–129.4, 145.6, 132, 222/52, 145.5, 144.5, 145.1; 700/231, 237, 700/239, 241; 99/280
See application file for complete search history.

(56) References Cited

U.S. PATENT DOCUMENTS

| | | | |
|---|---|---|---|
| 2,988,450 | A | 6/1961 | Bulatkin |
| 3,934,759 | A | 1/1976 | Giannella et al. |
| 4,008,832 | A | 2/1977 | Rodth |

(Continued)

FOREIGN PATENT DOCUMENTS

| | | | |
|---|---|---|---|
| AU | 8782624 | A | 12/1990 |
| AU | 8943614 | A | 10/1992 |

(Continued)

OTHER PUBLICATIONS

Disclosure Under 37 CFR § 1.56 dated Jan. 16, 2009, filed for U.S. Appl. No. 12/171,698.

(Continued)

*Primary Examiner* — Frederick C. Nicolas
(74) *Attorney, Agent, or Firm* — Sutherland Asbill & Brennan LLP

(57) ABSTRACT

Methods and apparatuses for providing a selectable beverage from a post-mix beverage dispenser are provided. In one embodiment, the method for providing a beverage having a separately selected color from a post-mix beverage dispensing system comprises: (a) providing at least two beverage bases for dispense from the post-mix beverage dispensing system; (b) separately storing at least two colorants in the post-mix beverage dispensing system; (c) receiving a request for a selected beverage base and the separately selected color with a computer processor; and (d) in response to the selection of the selected beverage base and the separately selected color, automatically dispensing through a single faucet of the post-mix beverage dispensing system, continuously in a predetermined ratio for any volume of the beverage dispensed, the selected beverage base and at least one of the colorants to provide the beverage having the separately selected color.

32 Claims, 2 Drawing Sheets

U.S. PATENT DOCUMENTS

| | | | |
|---|---|---|---|
| 4,211,342 | A | 7/1980 | Jamgochian et al. |
| 4,392,588 | A | 7/1983 | Scalera |
| 4,487,333 | A | 12/1984 | Pounder et al. |
| 4,619,378 | A | 10/1986 | de Man |
| 4,753,370 | A | 6/1988 | Rudick |
| 4,779,761 | A | 10/1988 | Rudick et al. |
| 4,784,495 | A | 11/1988 | Jonsson et al. |
| 4,793,518 | A | 12/1988 | Burton |
| 4,793,520 | A | 12/1988 | Gerber |
| 4,797,293 | A | 1/1989 | Evans et al. |
| 4,815,633 | A | 3/1989 | Kondo et al. |
| 4,821,925 | A | 4/1989 | Wiley et al. |
| 4,827,426 | A | 5/1989 | Patton et al. |
| 4,830,511 | A | 5/1989 | Smazik |
| 4,830,870 | A | 5/1989 | Davis, Jr. et al. |
| 4,860,923 | A | 8/1989 | Kirschner et al. |
| 4,881,663 | A | 11/1989 | Seymour |
| 4,889,148 | A | 12/1989 | Smazik |
| 4,923,092 | A | 5/1990 | Kirschner et al. |
| 4,923,093 | A | 5/1990 | Gerber |
| 4,932,564 | A | 6/1990 | Austin et al. |
| 4,934,567 | A | 6/1990 | Vahjen et al. |
| 4,955,507 | A | 9/1990 | Kirschner et al. |
| 5,000,357 | A | 3/1991 | Shannon et al. |
| 5,027,284 | A | 6/1991 | Senghaas et al. |
| 5,033,648 | A | 7/1991 | Nakayama et al. |
| 5,033,651 | A | 7/1991 | Whigham et al. |
| 5,056,686 | A | 10/1991 | Jarrett |
| 5,082,143 | A | 1/1992 | Schramm, Jr. |
| 5,087,469 | A | 2/1992 | Acree |
| 5,116,632 | A | 5/1992 | Miller |
| 5,139,708 | A | 8/1992 | Scott |
| 5,154,586 | A | 10/1992 | Rudick |
| 5,192,003 | A | 3/1993 | Billings |
| 5,207,148 | A | 5/1993 | Anderson et al. |
| 5,265,520 | A | 11/1993 | Giuliano |
| 5,292,030 | A | 3/1994 | Kateman et al. |
| 5,303,846 | A | 4/1994 | Shannon |
| 5,316,779 | A | 5/1994 | Morey |
| 5,341,957 | A | 8/1994 | Sizemore |
| 5,350,587 | A | 9/1994 | Plester |
| 5,433,967 | A | 7/1995 | Kateman et al. |
| 5,465,870 | A | 11/1995 | Sizemore |
| 5,473,909 | A | 12/1995 | Kateman et al. |
| 5,507,415 | A | 4/1996 | Sizemore |
| 5,522,660 | A | 6/1996 | O'Dougherty et al. |
| 5,526,959 | A | 6/1996 | Green |
| 5,603,257 | A | 2/1997 | Kateman et al. |
| 5,650,186 | A | 7/1997 | Annoni et al. |
| 5,653,157 | A | 8/1997 | Miller |
| 5,673,820 | A | 10/1997 | Green et al. |
| 5,725,125 | A | 3/1998 | Bessette et al. |
| 5,727,713 | A | 3/1998 | Kateman et al. |
| 5,731,981 | A | 3/1998 | Simard |
| 5,740,946 | A | 4/1998 | Swier et al. |
| 5,753,294 | A | 5/1998 | Savello |
| 5,758,571 | A | 6/1998 | Kateman et al. |
| 5,778,761 | A | 7/1998 | Miller |
| 5,797,436 | A | 8/1998 | Phallen et al. |
| 5,803,320 | A | 9/1998 | Cutting et al. |
| 5,842,603 | A | 12/1998 | Schroeder et al. |
| 5,868,065 | A | 2/1999 | Haggerty et al. |
| 5,868,279 | A | 2/1999 | Powell |
| 5,878,964 | A | 3/1999 | Hansen |
| 5,890,626 | A | 4/1999 | Wolski et al. |
| 5,925,392 | A | 7/1999 | Sponholtz |
| 5,955,132 | A | 9/1999 | Spica et al. |
| 5,960,997 | A | 10/1999 | Forsythe |
| 5,967,367 | A | 10/1999 | Orsborn |
| 5,980,969 | A | 11/1999 | Mordini et al. |
| 5,996,650 | A | 12/1999 | Phallen et al. |
| 5,997,236 | A | 12/1999 | Picioccio et al. |
| 6,045,007 | A | 4/2000 | Simmons |
| 6,047,859 | A | 4/2000 | Schroeder et al. |
| 6,098,524 | A | 8/2000 | Reese |
| 6,116,460 | A | 9/2000 | Kim et al. |
| 6,126,983 | A | 10/2000 | Miller |
| 6,135,319 | A | 10/2000 | Camezon |
| 6,149,035 | A | 11/2000 | Gorski et al. |
| 6,170,707 | B1 | 1/2001 | Wolski et al. |
| 6,182,555 | B1 | 2/2001 | Scheer et al. |
| 6,186,193 | B1 | 2/2001 | Phallen et al. |
| 6,223,948 | B1 | 5/2001 | Davis |
| 6,240,829 | B1 | 6/2001 | McGarrah |
| 6,253,963 | B1 | 7/2001 | Tachibana |
| 6,286,721 | B1 | 9/2001 | Pellegrini |
| 6,298,769 | B1 | 10/2001 | Stettes et al. |
| 6,321,938 | B1 | 11/2001 | Edwards et al. |
| 6,345,729 | B1 | 2/2002 | Santy, Jr. |
| 6,350,484 | B1 | 2/2002 | Ault |
| 6,364,159 | B1 | 4/2002 | Newman et al. |
| 6,374,845 | B1 | 4/2002 | Melendez et al. |
| 6,375,042 | B1 | 4/2002 | Goodwin |
| 6,375,043 | B1 | 4/2002 | LeBlanc |
| 6,394,312 | B1 | 5/2002 | Endou |
| 6,419,120 | B1 | 7/2002 | Bertone |
| 6,421,583 | B1 | 7/2002 | Sudolcan et al. |
| 6,422,422 | B1 | 7/2002 | Forbes |
| 6,435,375 | B2 | 8/2002 | Durham et al. |
| 6,450,369 | B1 | 9/2002 | Heyes |
| 6,464,464 | B2 | 10/2002 | Sabini et al. |
| 6,478,192 | B2 | 11/2002 | Heyes |
| 6,496,752 | B2 | 12/2002 | Sudolcan et al. |
| 6,536,626 | B2 | 3/2003 | Newman et al. |
| 6,547,100 | B2 | 4/2003 | Phillips et al. |
| 6,550,641 | B2 | 4/2003 | Newman et al. |
| 6,550,642 | B2 | 4/2003 | Newman et al. |
| 6,588,725 | B1 | 7/2003 | Wisnieski et al. |
| 6,600,968 | B2 | 7/2003 | Sudolcan et al. |
| 6,600,969 | B2 | 7/2003 | Sudolcan et al. |
| 6,607,013 | B1 | 8/2003 | Leoni |
| 6,650,962 | B2 | 11/2003 | Sudolcan et al. |
| 6,669,053 | B1 | 12/2003 | Garson et al. |
| 6,685,054 | B2 | 2/2004 | Kameyama |
| 6,689,410 | B2 | 2/2004 | Gerber |
| 6,694,748 | B2 | 2/2004 | Sergio et al. |
| 6,698,228 | B2 | 3/2004 | Kateman et al. |
| 6,698,621 | B2 | 3/2004 | Landers et al. |
| 6,745,595 | B1 | 6/2004 | Kateman et al. |
| 6,751,525 | B1 | 6/2004 | Crisp, III |
| 6,756,069 | B2 | 6/2004 | Scoville et al. |
| 6,758,571 | B2 | 7/2004 | Heaton |
| 6,759,072 | B1 | 7/2004 | Gutwein |
| 6,763,860 | B2 | 7/2004 | Jungmann et al. |
| 6,896,159 | B2 | 5/2005 | Crisp, III et al. |
| 6,907,741 | B2 | 6/2005 | Kateman |
| 6,915,732 | B2 | 7/2005 | Jones et al. |
| 6,915,926 | B2 | 7/2005 | Naik |
| 6,934,602 | B2 | 8/2005 | Sudolcan et al. |
| 6,935,532 | B2 | 8/2005 | Tinucci et al. |
| 6,941,858 | B2 | 9/2005 | Kateman |
| 6,945,157 | B2 | 9/2005 | Brown et al. |
| 6,952,928 | B2 | 10/2005 | Kateman et al. |
| 6,957,125 | B1 | 10/2005 | Rifkin |
| 6,983,863 | B2 | 1/2006 | Santy, Jr. |
| 6,988,641 | B2 | 1/2006 | Jones et al. |
| 6,994,231 | B2 | 2/2006 | Jones |
| 7,013,933 | B2 | 3/2006 | Sher et al. |
| 7,021,197 | B2 | 4/2006 | Chen et al. |
| 7,032,818 | B2 | 4/2006 | Thomas et al. |
| 7,036,686 | B2 | 5/2006 | Newton |
| 7,059,761 | B2 | 6/2006 | Gerber |
| 7,108,156 | B2 | 9/2006 | Fox |
| 7,147,131 | B2 | 12/2006 | Sher et al. |
| 7,156,259 | B2 | 1/2007 | Bethuy et al. |
| 7,159,743 | B2 | 1/2007 | Brandt et al. |
| 7,162,391 | B2 | 1/2007 | Knepler et al. |
| 7,231,279 | B2 | 6/2007 | Ghidotti |
| 7,243,818 | B2 | 7/2007 | Jones |
| 7,311,225 | B2 | 12/2007 | Newton |
| 7,311,226 | B2 | 12/2007 | Kado et al. |
| 7,328,815 | B2 | 2/2008 | Lowe |
| 7,337,920 | B2 | 3/2008 | Duck et al. |
| 7,347,344 | B2 | 3/2008 | Engels et al. |
| 7,367,475 | B2 | 5/2008 | Horth et al. |
| 7,380,494 | B2 | 6/2008 | Tobin et al. |
| 7,383,969 | B2 | 6/2008 | Horth et al. |

| | | | | |
|---|---|---|---|---|
| 7,445,133 | B2 | 11/2008 | Ludovissie et al. | |
| 7,806,294 | B2 | 10/2010 | Gatipon et al. | |
| 8,162,176 | B2 * | 4/2012 | Rudick | 222/1 |
| 2001/0017815 | A1 | 8/2001 | Ackermann et al. | |
| 2001/0041139 | A1 | 11/2001 | Sabini et al. | |
| 2002/0129712 | A1 | 9/2002 | Westbrook et al. | |
| 2003/0012081 | A1 | 1/2003 | Jungmann et al. | |
| 2003/0012864 | A1 | 1/2003 | Gerber | |
| 2003/0091443 | A1 | 5/2003 | Sabini et al. | |
| 2003/0097314 | A1 | 5/2003 | Crisp, III et al. | |
| 2003/0227820 | A1 | 12/2003 | Parrent | |
| 2004/0007594 | A1 | 1/2004 | Esch et al. | |
| 2004/0026447 | A1 | 2/2004 | Badin et al. | |
| 2004/0026452 | A1 | 2/2004 | Santiago et al. | |
| 2004/0040983 | A1 | 3/2004 | Ziesel | |
| 2004/0056046 | A1 | 3/2004 | Jones et al. | |
| 2004/0071841 | A1 | 4/2004 | Carhuff et al. | |
| 2004/0103033 | A1 | 5/2004 | Reade et al. | |
| 2004/0129720 | A1 | 7/2004 | Cheng et al. | |
| 2004/0170727 | A1 | 9/2004 | Howard et al. | |
| 2004/0194629 | A1 | 10/2004 | Jones et al. | |
| 2005/0061837 | A1 | 3/2005 | Sudolcan et al. | |
| 2005/0103799 | A1 | 5/2005 | Litterst et al. | |
| 2005/0112249 | A1 | 5/2005 | Herrick et al. | |
| 2005/0121466 | A1 | 6/2005 | Sher et al. | |
| 2005/0166761 | A1 | 8/2005 | Jones et al. | |
| 2005/0166766 | A1 | 8/2005 | Jones et al. | |
| 2005/0175767 | A1 | 8/2005 | Gerber | |
| 2005/0178793 | A1 | 8/2005 | Cheng et al. | |
| 2005/0199646 | A1 | 9/2005 | Moy | |
| 2005/0201196 | A1 | 9/2005 | Gerber | |
| 2005/0211768 | A1 | 9/2005 | Stillman | |
| 2005/0258186 | A1 | 11/2005 | Hart et al. | |
| 2005/0269360 | A1 | 12/2005 | Piatnik et al. | |
| 2005/0284885 | A1 | 12/2005 | Kadyk et al. | |
| 2006/0036454 | A1 | 2/2006 | Henderson | |
| 2006/0054614 | A1 | 3/2006 | Baxter et al. | |
| 2006/0081653 | A1 | 4/2006 | Boland et al. | |
| 2006/0097009 | A1 | 5/2006 | Bethuy et al. | |
| 2006/0108415 | A1 | 5/2006 | Thomas et al. | |
| 2006/0115570 | A1 | 6/2006 | Guerrero et al. | |
| 2006/0115572 | A1 | 6/2006 | Guerrero et al. | |
| 2006/0157504 | A1 | 7/2006 | Barker et al. | |
| 2006/0172056 | A1 | 8/2006 | Tobin et al. | |
| 2006/0196886 | A1 | 9/2006 | Fox | |
| 2006/0249536 | A1 | 11/2006 | Hartman et al. | |
| 2006/0278090 | A1 | 12/2006 | Spisak | |
| 2006/0283884 | A1 | 12/2006 | Saggin et al. | |
| 2007/0009365 | A1 | 1/2007 | Litterst et al. | |
| 2007/0012719 | A1 | 1/2007 | Holler | |
| 2007/0080169 | A1 | 4/2007 | Sher et al. | |
| 2007/0114243 | A1 | 5/2007 | Kershaw et al. | |
| 2007/0114244 | A1 | 5/2007 | Gatipon et al. | |
| 2007/0257059 | A1 | 11/2007 | Stevenson | |
| 2008/0023488 | A1 | 1/2008 | Guerrero et al. | |
| 2008/0029541 | A1 | 2/2008 | Wallace et al. | |
| 2008/0029542 | A1 | 2/2008 | Keller | |
| 2008/0041876 | A1 | 2/2008 | Frank et al. | |
| 2008/0083780 | A1 | 4/2008 | Romanyszyn et al. | |
| 2008/0083782 | A1 | 4/2008 | Heusser et al. | |
| 2008/0093382 | A1 | 4/2008 | Sher et al. | |
| 2008/0099506 | A1 | 5/2008 | Jamison et al. | |
| 2008/0110930 | A1 | 5/2008 | Wittkamp et al. | |
| 2008/0115672 | A1 | 5/2008 | Jones et al. | |
| 2008/0121655 | A1 | 5/2008 | Schultz et al. | |
| 2008/0142548 | A1 | 6/2008 | Moen et al. | |
| 2008/0149126 | A1 | 6/2008 | Abergel | |
| 2008/0149666 | A1 | 6/2008 | LaFlamme et al. | |
| 2008/0149669 | A1 | 6/2008 | Nicholson et al. | |

FOREIGN PATENT DOCUMENTS

| | | | |
|---|---|---|---|
| AU | 9182541 | A | 7/1993 |
| AU | 9180850 | A | 3/1994 |
| AU | 9456371 | A | 9/1994 |
| AU | 9516757 | B | 7/1997 |
| AU | 9719013 | B | 10/1997 |
| AU | 2002362597 | B2 | 12/1997 |
| AU | 9645173 | B | 1/1998 |
| AU | 734299 | B2 | 6/1998 |
| AU | 745372 | B2 | 7/1999 |
| AU | 199921393 | A1 | 10/1999 |
| AU | 744022 | B2 | 2/2000 |
| AU | 199891349 | A1 | 5/2000 |
| AU | 745539 | B2 | 6/2000 |
| AU | 756406 | B2 | 8/2000 |
| AU | 9892355 | A | 8/2000 |
| AU | 756091 | B2 | 2/2001 |
| AU | 760653 | B2 | 6/2001 |
| AU | 2001251732 | B2 | 10/2001 |
| AU | 2001100273 | B4 | 11/2001 |
| AU | 2001274664 | B2 | 12/2001 |
| AU | 2001281056 | B2 | 2/2002 |
| AU | 2002234639 | B2 | 9/2002 |
| AU | 200238172 | A1 | 11/2002 |
| AU | 2002256450 | B2 | 11/2002 |
| AU | 2002308704 | B2 | 11/2002 |
| AU | 2001270993 | B2 | 1/2003 |
| AU | 2002353654 | B2 | 6/2003 |
| AU | 2002300732 | A1 | 11/2003 |
| AU | 768650 | B2 | 12/2003 |
| AU | 2004280313 | A2 | 4/2005 |
| AU | 2005239709 | A1 | 12/2005 |
| AU | 2006201657 | A1 | 5/2006 |
| AU | 2005202597 | A1 | 8/2006 |
| AU | 2005225146 | B1 | 8/2006 |
| AU | 2007202881 | A1 | 7/2007 |
| AU | 2001282509 | B2 | 9/2007 |
| AU | 2002340677 | B2 | 9/2007 |
| AU | 2002257124 | B2 | 10/2007 |
| BE | 1005369 | A6 | 7/1993 |
| CA | 1242676 | | 2/1988 |
| CA | 2036622 | | 8/1991 |
| CA | 1290150 | | 10/1991 |
| CA | 2088976 | | 2/1992 |
| CA | 1300904 | | 5/1992 |
| CA | 1305104 | | 7/1992 |
| CA | 1336200 | | 7/1995 |
| CA | 2143512 | | 8/1995 |
| CA | 2205260 | | 6/1996 |
| CA | 2213081 | | 8/1996 |
| CA | 2215413 | | 10/1996 |
| CA | 2233275 | | 4/1997 |
| CA | 2195929 | | 9/1997 |
| CA | 2265623 | | 2/1998 |
| CA | 2243960 | | 6/1998 |
| CA | 2276189 | | 7/1998 |
| CA | 2211051 | | 8/1998 |
| CA | 2291152 | | 12/1998 |
| CA | 2135904 | | 4/1999 |
| CA | 2229832 | | 8/1999 |
| CA | 2336367 | | 1/2000 |
| CA | 2339361 | | 2/2000 |
| CA | 2339750 | | 2/2000 |
| CA | 2378126 | | 2/2001 |
| CA | 2378288 | | 2/2001 |
| CA | 2380439 | | 2/2001 |
| CA | 2568231 | | 2/2001 |
| CA | 2568233 | | 2/2001 |
| CA | 2568237 | | 2/2001 |
| CA | 2568239 | | 2/2001 |
| CA | 2568246 | | 2/2001 |
| CA | 2313794 | | 1/2002 |
| CA | 2422277 | | 3/2002 |
| CA | 2429523 | | 5/2002 |
| CA | 2432679 | | 6/2002 |
| CA | 2434818 | | 8/2002 |
| CA | 2441144 | | 9/2002 |
| CA | 2127808 | | 11/2002 |
| CA | 2386433 | | 11/2002 |
| CA | 2447082 | | 1/2003 |
| CA | 2453324 | | 1/2003 |
| CA | 2422545 | | 3/2003 |
| CA | 2473961 | | 3/2003 |
| CA | 2461307 | | 4/2003 |
| CA | 2466752 | | 5/2003 |
| CA | 2466961 | | 5/2003 |
| CA | 2419356 | | 8/2003 |
| CA | 2479243 | | 9/2003 |

| | | | |
|---|---|---|---|
| CA | 2482542 | | 11/2003 |
| CA | 2484170 | | 11/2003 |
| CA | 2486349 | | 11/2003 |
| CA | 2495317 | | 2/2004 |
| CA | 2501747 | | 4/2004 |
| CA | 2513719 | | 8/2004 |
| CA | 2513891 | | 8/2004 |
| CA | 2515188 | | 8/2004 |
| CA | 2444027 | | 11/2004 |
| CA | 2521098 | | 11/2004 |
| CA | 2522843 | | 11/2004 |
| CA | 2524049 | | 11/2004 |
| CA | 2476338 | | 1/2005 |
| CA | 2530383 | | 1/2005 |
| CA | 2533058 | | 2/2005 |
| CA | 2486041 | | 4/2005 |
| CA | 2544144 | | 5/2005 |
| CA | 2544274 | | 5/2005 |
| CA | 2576374 | | 7/2005 |
| CA | 2554502 | | 8/2005 |
| CA | 2557674 | | 9/2005 |
| CA | 2558876 | | 9/2005 |
| CA | 2565821 | | 11/2005 |
| CA | 2566240 | | 11/2005 |
| CA | 2566463 | | 12/2005 |
| CA | 2570288 | | 1/2006 |
| CA | 2574860 | | 1/2006 |
| CA | 2572230 | | 2/2006 |
| CA | 2518803 | | 3/2006 |
| CA | 2577849 | | 3/2006 |
| CA | 2584150 | | 4/2006 |
| CA | 2587098 | | 5/2006 |
| CA | 2588282 | | 6/2006 |
| CA | 2588393 | | 6/2006 |
| CA | 2591788 | | 6/2006 |
| CA | 2592052 | | 6/2006 |
| CA | 2594854 | | 7/2006 |
| CA | 2596016 | | 8/2006 |
| CA | 2596020 | | 8/2006 |
| CA | 2545868 | | 11/2006 |
| CA | 2598590 | | 11/2006 |
| CA | 2527520 | | 5/2007 |
| CA | 2537775 | | 8/2007 |
| CA | 2580317 | | 9/2007 |
| DE | 381482 | | 9/1923 |
| EP | 0083467 | A1 | 7/1983 |
| EP | 0104447 | A2 | 4/1984 |
| EP | 0105017 | B1 | 4/1984 |
| EP | 0112638 | A2 | 7/1984 |
| EP | 0136005 | A1 | 4/1985 |
| EP | 0154681 | A1 | 9/1985 |
| EP | 0158096 | A2 | 10/1985 |
| EP | 0175815 | A2 | 4/1986 |
| EP | 307150 | A1 | 3/1989 |
| EP | 0643 667 | B1 | 4/1996 |
| EP | 727165 | A1 | 8/1996 |
| EP | 0729741 | A1 | 9/1996 |
| EP | 0786948 | B1 | 2/1999 |
| EP | 0958234 | B1 | 11/2001 |
| EP | 1380536 | A1 | 1/2004 |
| EP | 1453018 | A1 | 9/2004 |
| EP | 1538124 | A1 | 6/2005 |
| EP | 0672616 | A2 | 9/2005 |
| EP | 1829818 | A2 | 9/2007 |
| GB | 2429694 | A | 3/2007 |
| JP | 2006014745 | A2 | 1/2006 |
| WO | WO 8809766 | A1 | 12/1988 |
| WO | WO 9325465 | A1 | 12/1993 |
| WO | WO 9325466 | A2 | 12/1993 |
| WO | WO 9522505 | A1 | 8/1995 |
| WO | WO 9606036 | A1 | 2/1996 |
| WO | WO 9612644 | A1 | 5/1996 |
| WO | WO 9747555 | A1 | 12/1997 |
| WO | WO 9806660 | A1 | 2/1998 |
| WO | WO 9850165 | A1 | 11/1998 |
| WO | WO 9902449 | A1 | 1/1999 |
| WO | WO 9907634 | A1 | 2/1999 |
| WO | WO 0009437 | A2 | 2/2000 |
| WO | WO 0010909 | A1 | 3/2000 |
| WO | WO 0015049 | A1 | 3/2000 |
| WO | WO 0017090 | A1 | 3/2000 |
| WO | WO 0018499 | A1 | 4/2000 |
| WO | WO 0038825 | A1 | 7/2000 |
| WO | WO 0063107 | A | 10/2000 |
| WO | WO 0065316 | A1 | 11/2000 |
| WO | WO 0069274 | A1 | 11/2000 |
| WO | WO 0122836 | A1 | 4/2001 |
| WO | WO 0134470 | A1 | 5/2001 |
| WO | WO 0154551 | A1 | 8/2001 |
| WO | WO 0156918 | A1 | 8/2001 |
| WO | WO 0191601 | A2 | 12/2001 |
| WO | WO 02057178 | A1 | 7/2002 |
| WO | WO 02059035 | A2 | 8/2002 |
| WO | WO 02066835 | A1 | 8/2002 |
| WO | WO 02078498 | A1 | 10/2002 |
| WO | WO 02087350 | A1 | 11/2002 |
| WO | WO 03002449 | A1 | 1/2003 |
| WO | WO 03016198 | A1 | 2/2003 |
| WO | WO 03041513 | A2 | 5/2003 |
| WO | WO 03068665 | A1 | 9/2003 |
| WO | WO 03084860 | A1 | 10/2003 |
| WO | WO 03091152 | A2 | 11/2003 |
| WO | WO 03097497 | A1 | 11/2003 |
| WO | WO 03099704 | A1 | 12/2003 |
| WO | WO 03107110 | A1 | 12/2003 |
| WO | WO 2004011361 | A1 | 2/2004 |
| WO | WO 2004019707 | A2 | 3/2004 |
| WO | WO 2004036515 | A1 | 4/2004 |
| WO | WO 2004050537 | A2 | 6/2004 |
| WO | WO 2004050541 | A2 | 6/2004 |
| WO | WO 2004051163 | A2 | 6/2004 |
| WO | WO 2004083789 | A1 | 10/2004 |
| WO | WO 2004084688 | A1 | 10/2004 |
| WO | WO 2004094585 | A2 | 11/2004 |
| WO | WO 2004100756 | A3 | 11/2004 |
| WO | WO 2004101122 | A3 | 11/2004 |
| WO | WO 2004101424 | A1 | 11/2004 |
| WO | WO 2004107938 | A2 | 12/2004 |
| WO | WO 2005007559 | A3 | 1/2005 |
| WO | WO 2005007560 | A3 | 1/2005 |
| WO | WO 2005012157 | A1 | 2/2005 |
| WO | WO 2005018788 | A1 | 3/2005 |
| WO | WO 2005021417 | A2 | 3/2005 |
| WO | WO 2005047171 | A1 | 5/2005 |
| WO | WO 2005047172 | A1 | 5/2005 |
| WO | WO 2005068349 | A1 | 7/2005 |
| WO | WO 2005069919 | A2 | 8/2005 |
| WO | WO 2005070816 | A1 | 8/2005 |
| WO | WO 2005071267 | A1 | 8/2005 |
| WO | WO 2005077811 | A3 | 8/2005 |
| WO | WO 2005079329 | A3 | 9/2005 |
| WO | WO 2005079361 | A2 | 9/2005 |
| WO | WO 2005085121 | A1 | 9/2005 |
| WO | WO 2005089922 | A3 | 9/2005 |
| WO | WO 2005094642 | A1 | 10/2005 |
| WO | WO 2005095229 | A1 | 10/2005 |
| WO | WO 2005097665 | A1 | 10/2005 |
| WO | WO 2005099469 | A2 | 10/2005 |
| WO | WO 2005111955 | A1 | 11/2005 |
| WO | WO 2005113411 | A2 | 12/2005 |
| WO | WO 2005113416 | A1 | 12/2005 |
| WO | WO 2006001277 | A1 | 1/2006 |
| WO | WO 2006005401 | A2 | 1/2006 |
| WO | WO 2006005923 | A1 | 1/2006 |
| WO | WO 2006013362 | A1 | 2/2006 |
| WO | WO 2006016182 | A3 | 2/2006 |
| WO | WO 2006021039 | A1 | 3/2006 |
| WO | WO 2006023310 | A2 | 3/2006 |
| WO | WO 2006024409 | A3 | 3/2006 |
| WO | WO 2006036353 | A1 | 4/2006 |
| WO | WO 2006043808 | A3 | 4/2006 |
| WO | WO 2006058692 | A1 | 6/2006 |
| WO | WO 2006058713 | A1 | 6/2006 |
| WO | WO 2006066338 | A1 | 6/2006 |
| WO | WO 2006076733 | A2 | 7/2006 |
| WO | WO 2006078370 | A1 | 7/2006 |
| WO | WO 2006082211 | A3 | 8/2006 |
| WO | WO 2006088990 | A2 | 8/2006 |

| | | | |
|---|---|---|---|
| WO | WO 2006123131 | A1 | 11/2006 |
| WO | WO 2006128695 | A3 | 12/2006 |
| WO | WO 2006131431 | A1 | 12/2006 |
| WO | WO 2006131940 | A1 | 12/2006 |
| WO | WO 2007000028 | A1 | 1/2007 |
| WO | WO 2007001578 | A1 | 1/2007 |
| WO | WO 2007001580 | A1 | 1/2007 |
| WO | WO 2007002575 | A1 | 1/2007 |
| WO | WO 2007011830 | A2 | 1/2007 |
| WO | WO 2007056407 | A2 | 5/2007 |
| WO | WO 2007127525 | A2 | 11/2007 |
| WO | WO 2007146452 | A2 | 12/2007 |
| WO | WO 2008015097 | A2 | 2/2008 |
| WO | WO 2008022300 | A1 | 2/2008 |
| WO | WO 2008028294 | A1 | 3/2008 |
| WO | WO 2008065401 | A1 | 6/2008 |
| WO | WO 2008066757 | A2 | 6/2008 |

OTHER PUBLICATIONS

European Examination Report dated Sep. 1, 2010 for Application No. EP 08798790.5.

Fast & Fluid—The Tinting Company, "Dispensers," (http://www.fast-fluid.com/product/cosmeticsDispensersEng.asp?MenuItemID=12&parentID=28) Dec. 28, 2005.

Fast & Fluid—The Tinting Company, "Mixers & Shakers," (http://www.fst-fluid.com/product/cosmeticsShakersMixersEng.asp?MenuItemID=13&parentID=28) Dec. 28, 2005.

Fast & Fluid—The Tinting Company, "Prismapro," (http://www.fast-fluid.com/software/primaProEng.asp?ParentID=29) Dec. 28, 2005.

Fast & Fluid—The Tinting Company, "TintMasterHairCare (hair dye dispenser)," (http://www.fast-fluid.com/product/detailProduct.asp-?ProductID=71&parentID=28) Dec. 28, 2005.

International Preliminary Report on Patentability for PCT/US2008/074458 mailed Oct. 23, 2009.

International Search Report & Written Opinion (PCT/US2007/062973), International Searching Authority mailed Dec. 21, 2007.

International Search Report & Written Opinion (PCT/US2008/074458), International Searching Authority mailed Nov. 26, 2008.

Ipifini, "Choice Enabled Packaging," (www.ipifini.com/tech.html) 2006.

Lancer, "Redirect your store traffic from the cooler to your more profitable post-mix fountain area by adding fun and creating excitement," FS Series (Apr. 2003), p. 4.

Stillman, J.A., "Color Influences Flavor Identification in Fruit-flavored Beverages," Journal of Food Science, vol. 58, No. 4, Jul. 1993, pp. 810-812.

Taylor, "702 Soft Serve Freezer," published at www.taylor-company.com/products/s_pdf/s0702.pdf, publication date: Dec. 2004.

* cited by examiner

METHOD AND APPARATUS FOR PROVIDING A SELECTABLE BEVERAGE

CROSS-REFERENCE TO RELATED APPLICATIONS

This application is a continuation of U.S. patent application Ser. No. 12/171,698, filed Jul. 11, 2008, now U.S. Pat. No. 8,162,176 which claims the benefit of U.S. Provisional Application No. 60/970,278, filed Sep. 6, 2007, each of which is incorporated herein by reference in their entirety.

TECHNICAL FIELD

The present invention relates to methods and apparatuses for providing a selectable beverage.

BACKGROUND OF THE INVENTION

In various applications, products are produced with a particular color and/or flavor. For example, there are a number of beverage dispensing systems in which flavors containing colorants are added. Generally, the color of the beverage is directly linked to the flavor or flavors added to the beverage such as dark brown for cola. For manufacturers, the option to produce a specific beverage having a variety of flavors and/or colors is unavailable or burdensome, thereby limiting the specific product to only one flavor and one color. For users, the variety of selection is limited by the beverage provided by the manufacturer.

Therefore, it would be desirable to provide a beverage in a manner that employs minimum burden and yet provides more options for the coloring and/or flavoring of the beverage. More particularly, it would be desirable to provide a beverage wherein the color of the beverage is not essentially linked to the flavor of the beverage. In addition, it would be desirable to provide more options for mixing beverages based on a user's individual preference. Moreover, it would be desirable to allow the user to select the option of have a random beverage provided.

SUMMARY OF THE INVENTION

In one aspect, the present invention relates to a method for providing a beverage having a separately selected color from a post-mix beverage dispensing system comprising: (a) providing at least two beverage bases for dispense from the post-mix beverage dispensing system; (b) separately storing at least two colorants in the post-mix beverage dispensing system; (c) receiving a request for a selected beverage base and the separately selected color with a computer processor; and (d) in response to the selection of the selected beverage base and the separately selected color, automatically dispensing through a single faucet of the post-mix beverage dispensing system, continuously in a predetermined ratio for any volume of the beverage dispensed, the selected beverage base and at least one of the colorants to provide the beverage having the separately selected color.

In another aspect, the present invention relates to a method for providing a beverage from a post-mix beverage dispensing system comprising: (a) providing at least two beverages for dispense from the post-mix beverage dispensing system; (b) providing a user interface for user interactions with a computer processor; (c) presenting via the user interface a choice of one of the beverages or a blended beverage, wherein the blended beverage comprises at least two of the beverages; (d) receiving a selection of one of the beverages or the blended beverage via the user interface with the computer processor; and (e) in response to the selection of one of the beverages or the blended beverage, automatically dispensing through a single faucet of the post-mix beverage dispensing system the selected beverage or at least two of the beverages to form the blended beverage.

In yet another aspect, the present invention relates to a method for providing a beverage from a post-mix beverage dispensing system comprising: (a) providing at least two beverages for dispense from the post-mix beverage dispensing system; (b) providing a user interface for user interactions with a computer processor programmed with a randomizing program; (c) presenting via the user interface a choice of one of the beverages or a random beverage; (d) receiving a selection of one of the beverages or the random beverage via the user interface with the computer processor; (e) in response to the selection of the random beverage, determining with the randomizing program a random selection of at least one of the beverages; and (f) automatically dispensing the selected beverage or the random beverage from the post-mix beverage dispensing system.

In a further aspect, the present invention relates to a post-mix beverage dispensing system for providing a beverage having a separately selected color, the post-mix beverage dispensing system comprising: (a) at least two sources for providing at least two beverage bases for dispense from the post-mix beverage dispensing system; (b) at least two colorant storage containers for separately storing at least two colorants in the post-mix beverage dispensing system; (c) a computer processor for receiving a request for a selected beverage base and the separately selected color; and (d) a single faucet for automatically dispensing, continuously in a predetermined ratio for any volume of the beverage dispensed, in response to the selection of the selected beverage base and the separately selected color, the selected beverage base and at least one of the colorants to provide the beverage having the separately selected color.

In another aspect, the present invention relates to post-mix beverage dispensing system comprising: (a) at least two sources for providing at least two beverages for dispense from the post-mix beverage dispensing system; (b) a user interface for user interactions with a computer processor; and (c) a single faucet. The user interface is adapted to present a choice of one of the beverages or a blended beverage. The blended beverage comprises at least two of the beverages. The computer processor is adapted to receive a selection of one of the beverages or the blended beverage. The single faucet is adapted for automatically dispensing, in response to the selection of one of the beverages or the blended beverage, the selected beverage or at least two of the beverages to form the blended beverage.

In an additional aspect, the present invention relates to a post-mix beverage dispensing system comprising: (a) at least two sources for providing at least two beverages for dispense from the post-mix beverage dispensing system; and (b) a user interface for user interactions with a computer processor programmed with a randomizing program. The user interface is adapted to present a choice of one of the beverages or a random beverage. The computer processor is adapted to receive a selection of one of the beverages or the random beverage. The computer processor also is adapted to, in response to the selection of the random beverage via the user interface, determine with the randomizing program a random selection of at least one of the beverages. The post-mix beverage dispensing system is adapted to automatically dispense the selected beverage or the random beverage.

Other objects, features, and advantages of this invention will be apparent from the following detailed description, drawing, and claims.

DETAILED DESCRIPTION OF THE INVENTION

Figure 1:
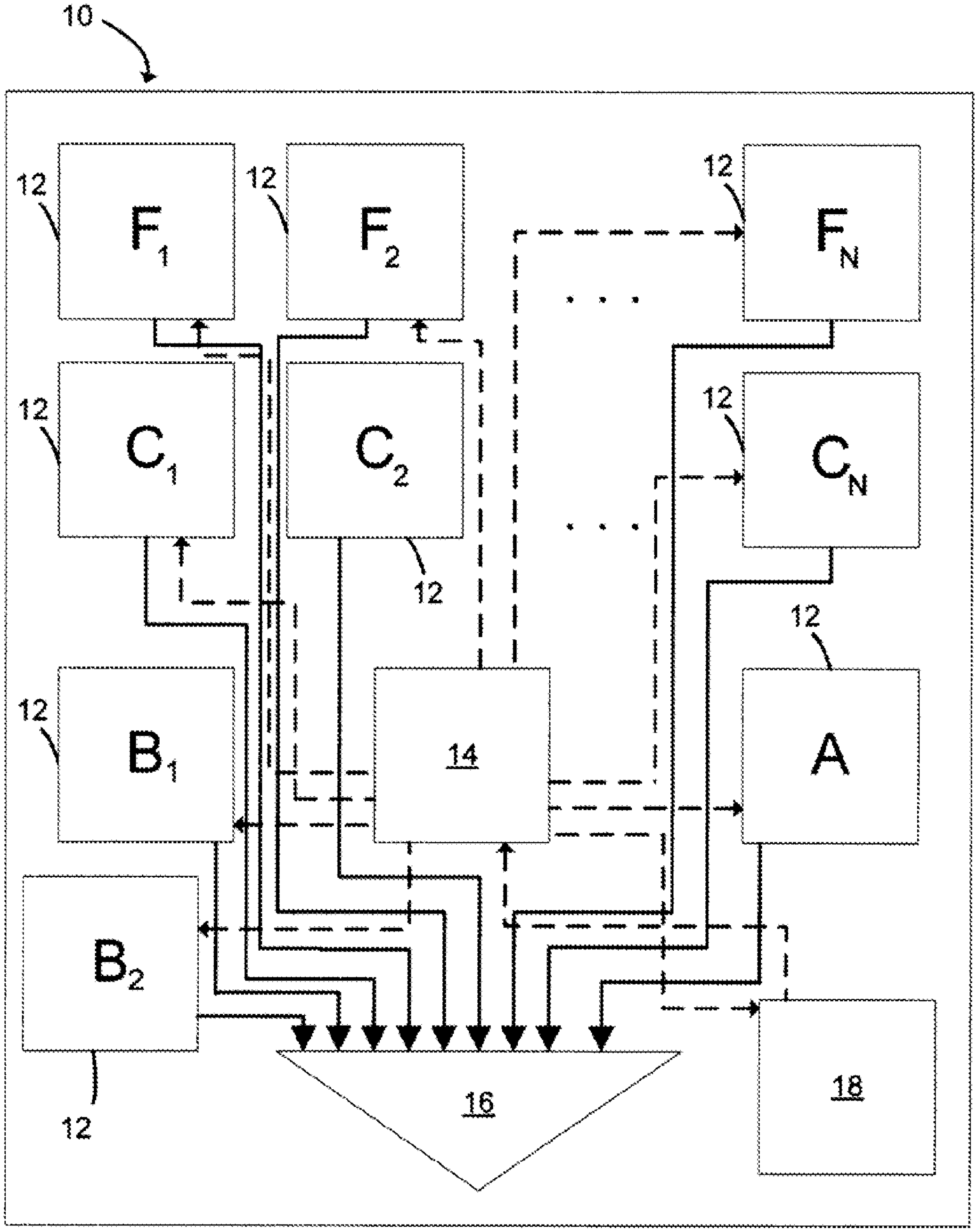
FIG. 1 is a schematic illustration of an apparatus for providing a variety of beverages having separately selectable beverage colors and/or separately selectable beverage flavors, a blended beverage, and a randomly selected beverage in accordance with an embodiment of the present invention.

While the specification concludes with the claims particularly pointing out and distinctly claiming the invention, it is believed that aspects of the present invention will be better understood from the following description.

As used herein, "comprising" means that other steps which do not affect the end result can be added. This term encompasses the terms "consisting of" and "consisting essentially of". The methods of the present invention can comprise, consist of, and consist essentially of the essential elements and limitations of the invention described herein, as well as any of the additional or optional components, steps, or limitations described herein.

"Beverage," as used herein, includes, but is not limited to, pulp and pulp-free citrus and non-citrus fruit juices, fruit drink, vegetable juice, vegetable drink, milk, soy milk, protein drink, soy-enhanced drink, tea, water, isotonic drink, vitamin-enhanced water, soft drink, flavored water, energy drink, coffee, smoothies, yogurt drinks, hot chocolate and combinations thereof. The beverage may also be carbonated or non-carbonated. The beverage may comprise beverage components (e.g., beverage bases, colorants, flavorants, and additives).

The terms "native color" or "native-colored" refers to the color of the beverage component in its natural, unaltered form. For example, a beverage component of the present invention may be a "native-colored" beverage such as milk. In such case, the native color is white. Another example would be that of orange juice wherein the native color is orange.

"Uncolored" refers to the substantially clear, substantially colorless form of a beverage component, or to that of a beverage component which has not been altered from its native color.

The terms "native flavor" or "native-flavored" refers to the flavor of a beverage component in its natural, unaltered form absent of additives such as sweeteners, etc.

"Unflavored" refers to the substantially flavorless form of a beverage component or to that of a beverage component which has not been altered from its native flavor.

The term "beverage base" refer to parts of the beverage or the beverage itself prior to additional colorants, additional flavorants, and/or additional additives being added by the methods or apparatuses of the present invention and may be distinguishable from the beverages of the present invention, i.e. final product (a) wherein a particular color and/or flavor has been selected or (b) wherein two or more beverages have been blended. According to certain embodiments, beverage bases may comprises a mixture of beverage base components.

The term "beverage base component" refers to components which may be included in beverage bases. According to certain embodiments of the present invention, the beverage base component may comprise parts of beverages which may be considered food items by themselves.

Thus, for the purposes of requesting, selecting, or dispensing a beverage base, a beverage base formed from separately stored beverage base components may be equivalent to a separately stored beverage base. For the purposes of requesting, selecting or dispensing a beverage, a beverage formed from separately stored beverage components may be equivalent to a separately stored beverage The term "blended beverage" includes final products wherein two or more beverages have been blended or mixed or otherwise combined to form a final product.

By "separately stored" it is meant that the components of the present invention are kept separate until combined. For instance, the components may be separately stored individually in each container or may be all stored in one container wherein each component is individually packaged (e.g., plastic bags) so that they do not blend while in the container. In some embodiments, the container, itself, may be individual, adjacent to, or attached to another container.

According to certain embodiments, the present invention provides for methods and apparatuses that allow for the dispensing of a variety of beverages having a variety of selected colors and/or selected flavors, a blended beverage, and/or a randomly selected beverage. Embodiments are described in detail below and are exemplified in FIGS. 1 and 2. It should be understood that any of the features in embodiments of the methods and apparatuses of the present invention described may be used in combination with each other in alternate embodiments.

According to certain embodiments, the beverages and beverage components of the present invention may comprise, but are not limited to, vitamins, dairy products, soy products, food products, beauty products, health care products and combinations thereof. Additionally, beverages and beverage components of some embodiments of the present invention may be in forms, including, but not limited to, liquids, gases, gels, colloids, solid/fluid mixtures or suspensions, liquid/gas mixtures or solutions, and mixtures thereof.

According to certain embodiments of the present invention, methods for providing a beverage wherein at least two beverage bases are provided for dispense from a post-mix beverage dispensing system and wherein the color of the beverage may be separately selected from at least two colorant storage containers comprising at least two separately stored colorants. Suitable beverage bases for use in some embodiments of the present invention include, but are not limited to syrups, concentrates, and the like. In certain embodiments, the beverage bases may be provided by separately storing the beverage bases in the post-mix beverage dispenser. In alternate embodiments, the beverage bases may be provided from beverage base sources external to the post-mix beverage dispenser.

In some embodiments, the beverage bases may be provided by separately storing in the post-mix beverage dispenser at least two beverage base components for forming the beverage bases. Examples of beverage base components for use in certain embodiments include sweeteners such as water, carbonated water, sweeteners, thickeners, dairy products, soy products, fruit products, vegetable products, food products, and combinations thereof.

According to certain embodiments, the colorant may be flavored, unflavored or native-flavored. In some embodiments, the colorant may be any substance that affects the color of a beverage and which typically would not be considered a food item by itself. In particular embodiments, the colorant may be a natural colorant or an artificial colorant. Suitable colorants for use in some embodiments of the present invention include, but are not limited to, food coloring, caramel coloring, cochineal, titanium dioxide, food grade dyes, vegetable extracts, or any other suitable coloring and combinations thereof.

According to certain embodiments of the present invention, in response receipt by a computer processor of the selection of a beverage having a separately selected color, the selected beverage base and at least one of the colorants may be automatically dispensed, continuously in a predetermined ratio for any volume of the beverage dispensed, from a single faucet of a post-mix beverage dispenser to provide a beverage having the particularly selected color. In some embodiments, the dispensing of the selected beverage base may comprise dispensing beverage base components which form the selected beverage base. Thus, for example, certain embodiments of methods of the present invention may provide for a selected beverage that is milk wherein green is the separately selected color. In such embodiments, the final beverage, therefore, would be green milk.

Options provided by embodiments of the present invention's separate storage of colorants are even more infinite as the varied intensity of colors contributes to the endless possibilities for color variance. For example, certain embodiments of methods of the present invention may comprise colorant storage containers wherein at least one storage container comprises a red food coloring, at least one storage container comprises a yellow food coloring, at least one storage container comprises a blue food coloring, and at least two storage containers comprises at least two substantially colorless beverage bases. In such an embodiment, the variety of selectable colored products may include, but is not limited to, red, yellow, blue, purple, orange, green, brown, various hues, intensities, saturations, or brightness thereof or almost any spectral color, as different amounts of some or all of the colorants can be used to provide any color to the beverage bases.

In certain embodiments, a separately selected color having a separately selected intensity, separately selected saturation, or separately selected brightness.

Additionally, certain embodiments of the present invention provide methods for providing a beverage wherein the color and the flavor of the beverage may be separately selected from at least two colorant storage containers and at least two flavorant storage containers. According to certain embodiments, the flavorants may each be colored, uncolored or native-colored. In some embodiments, the flavorant may be any substance that affects the flavor of a beverage and which typically would not be considered a food item by itself. In particular embodiments, the flavorants may be natural flavorants or artificial flavorants. Suitable flavorants for use in certain embodiments of the present invention include, but are not limited to, food acids, flavor oils, flavor chemicals, natural flavor extracts, or any other suitable food grade flavoring and combinations thereof. According to certain embodiments, in response to the selection of a beverage having a separately selected color and a separately selected flavor, at least one separately stored colorant, at least one separately stored flavorant, and at least one separately stored beverage base may be automatically dispensed, continuously in a predetermined ratio for any volume of the beverage dispensed, from a single faucet of a post-mix beverage dispenser to provide a beverage having the particularly selected color and flavor. Thus, for example, embodiments of methods of the present invention may provide for a selected beverage that is juice wherein purple is the selected color and strawberry is the selected flavor. In such an example, the final beverage, therefore, would be purple-colored, strawberry-flavored juice.

As a consequence of storing the colorants and the flavorants separately in certain embodiments, the number of selectable beverages can exceed the number of stored colorants and the number of stored flavorants. Therefore, according to such embodiments, more options may be provided without the worries of additional or excess storage space for the various options. For example, an embodiment of the present invention may provide seven storage containers comprising two storage containers comprising two substantially colorless beverage bases; a first colorant storage container comprising a red colorant and a second colorant storage container comprising a yellow colorant; and a first flavorant storage container comprising a substantially colorless cola flavor, a second flavorant storage container comprising a substantially colorless cherry flavor, and a third flavorant storage container comprising a substantially colorless vanilla flavor. In such an embodiment, seven storage containers are able to provide at least 24 different colorless and colored varieties of selectable flavored beverages including red cola, red cherry flavored cola, red cherry and vanilla flavored cola, red vanilla flavored cola, yellow cola, yellow cherry flavored cola, yellow cherry and vanilla flavored cola, yellow vanilla flavored cola, orange cola, orange cherry flavored cola, orange cherry and vanilla flavored cola, orange vanilla flavored cola, and various color hues thereof with either of the two beverage bases.

In certain embodiments of the present invention, the variety of selectable beverages may be further increased by the possibilities of providing additives as optional beverage components. In some embodiments, the additive may be any substance which affects a property of the beverage other than flavor or color and which typically would not be considered a food item by itself. Suitable additives for embodiments of the present invention, may include but are not limited to, preservatives, surfactants, thickeners, anti-foaming agents, food acids, vitamins, minerals, supplements (e.g., chlorella, spirulina, and the like), caffeine, caloric sweeteners (natural and artificial), non-caloric sweeteners (natural and artificial), carbonation, diluents, beauty products, health care products, and the like. For example, an embodiment of the methods of the present invention may comprise at least two storage containers comprising at least two beverage bases, at least one storage container comprising a yellow colorant, at least one storage container comprising a cola flavorant, and at least one storage container comprising an additive, wherein the additive may be a non-caloric sweetener or a nutritive sweetener such as sucrose or high fructose corn syrup. In such an example, the option of the beverage to be dispensed has now just been expanded to include a "regular," a "mid-cal," or a "diet" sweetened version of the beverage. Thus, a user privy to the benefits of such an embodiment of the present invention could select a yellow diet cola.

Colorants, flavorants, additives, and other beverage components of certain embodiments of the present invention can be combined in a variety of ways. For example, such elements may be combined in certain embodiments of the present invention within a post-mix beverage dispenser that will dispense the beverage, within the dispenser (e.g., in a nozzle), outside of the dispenser (e.g., in-air mixing), or combinations thereof. Thus, for example, certain embodiments of the present invention may provide a beverage wherein the selected colorant, selected flavorant, and selected beverage base may be dispensed outside the apparatus separately and combined at a point that is within or proximate to a container suitable to hold such beverage. Without being limiting, some embodiments of the present invention may be used within manufacturing facilities such as within in-store apparatuses, vending apparatuses, and the like.

Because the colorants, flavorants, additives, and beverage bases are stored separately in accordance with certain embodiments of the present invention, an infinite variety of beverages may be produced wherein the color is not necessarily associated with a particular flavor or beverage and vice-versa. In some embodiments of the present invention, a variety of colors may be produced by adjusting the amount and proportion of the colorant dispensed. It should be understood that, in certain embodiments of the present invention, adjustment of the amount and proportion of the colorant dispensed may be dependant upon whether the flavorants, additives, and other beverage components dispensed for a particular beverage are colored, substantially colorless (e.g., substantially clear), or native colored. Thus, beverages of certain embodiments of the present invention may have color saturation and flavor intensity adjusted independently from one another. As a result of the flexibility of embodiments of the present invention, the color of a beverage, for example, can be any color and is independent of the flavor of the beverage. Thus, in certain embodiments, a beverage with a very strong cherry flavor could have a faint red color while a beverage having a very mild cherry flavor could be a deep saturated red color. Furthermore, embodiments of the present invention may advantageously provide the aesthetically pleasing qualities of visually undesirable beverages without affecting the native flavor and/or beverage itself.

Moreover, embodiments of methods of the present invention provide for continuous mixing and flows in the correct ratio for a pour of any volume in contrast to a conventional batch operation where a predetermined amount of ingredients are combined. In particular, embodiments of methods of the present invention may dispense the beverage base or beverage base components, the colorants, the flavorants, and/or the additives continuously in a predetermined ratio for any volume of the beverage dispensed. Thus, in certain embodiments of the present invention, the same volume ratios of each component remain constant for any amount of beverage dispensed.

Certain embodiments of the present invention additionally provide methods for providing a beverage wherein at least two beverages are provided for dispense from a post-mix beverage dispensing system and wherein a user interface provides a choice of one of the beverages and a blended beverage. In some embodiments the beverages blended to form the blended beverage may be selected by an automated program.

In other embodiments, the beverages blended to form the blended beverage may be selected by a user. For instance, in one embodiment, in response to receipt by a computer processor of a selection of the blended beverage, a choice of beverages to be blended may be presented via the user interface. Upon receipt by the computer processor of a selection of at least two of the beverages to be blended in such an embodiment, the beverages corresponding to the selection may be automatically dispensed through a single faucet of the post-mix beverage dispensing system.

Thus, for example, embodiments of methods of the present invention may provide for a selected beverage that is a blend of a cola beverage, a lemon-lime beverage, and an orange beverage. By providing a blended beverage option in certain embodiments of the present invention, users are provided with the convenience of blending beverages of their choice in one pour, thus improving speed and reproducibility in providing the blended beverages.

In addition, embodiments of methods of the present disclosure may provide for beverage components and colorants stored separately in a post-mix beverage dispenser and wherein a user interface provides a choice of one of the beverages, a blended beverage, and a separately selected color. In response to receipt by a computer processor of one of the beverages or the blended beverage and a separately selected color in such embodiments, at least two of the beverage components and at least one of the colorants corresponding to the selection may be automatically dispensed through a single faucet of the post-mix beverage dispensing system. Thus, such embodiments provide blended beverages which may have a color not necessarily associated with a particular chosen beverage to be blended.

In other embodiments, methods of the present disclosure may provide for a blended beverage comprising a branded beverage. Suitable examples of branded beverages for use in embodiments of the present invention include, but are not limited to, COCA-COLA®, SPRITE®, FANTA®, or POWERADE®.

While the foregoing embodiments of methods provide a beverage wherein each component may be individually selected, it is well within the scope of embodiments of the present invention to also provide a beverage requested from an automated program such as a pre-programmed recipe, a randomizing program or a combination thereof. For example, the separately selected color and/or the beverage base in certain embodiments may be selected by a pre-programmed recipe or a randomizing recipe. Likewise, the beverages in certain embodiments may be selected by a pre-programmed recipe or a randomizing recipe to provide a blended beverage. For instance, of a pre-programmed blended beverage of branded beverages in certain embodiments may be a blended beverage comprising COCA-COLA® and SPRITE®.

Moreover, embodiments of the present invention include methods for providing a beverage wherein at least two beverages are provided for dispense from a post-mix beverage dispensing system and wherein a user interface provides a choice of one of the beverages and a random beverage. In particular embodiments, the random beverage may comprise one of the beverages or a mixture of two of the beverages (i.e., a random blended beverage). In some embodiments, the random beverage may comprise a random beverage base and separately selected random color. In certain embodiments, in response to receipt by a computer processor, which is programmed with a randomizing program, of a selection of the random beverage, a random selection of one or more of the beverages is determined with the randomizing program and the random selection is automatically dispensed.

In addition, embodiments of methods of the present disclosure may provide for beverage components and colorants stored separately in a post-mix beverage dispenser and wherein a user interface provides a choice of one of the beverages, a random beverage, and a separately selected color. In such embodiments, in response to receipt by a computer processor, which is programmed with a randomizing program, of a selection of the random choice and a separately selected color, a random selection of at least one of the beverage bases is determined with the randomizing program and at least one of the beverage components and at least one of the colorants corresponding to the selection may be automatically dispensed. Thus, in such embodiments, a random beverage may have a color which is separately chosen.

According to certain embodiments of the present invention, user preferences could be further catered to by using devices for receiving identification information associated with a user and retrieving a user profile based on the identification information with the methods of the present invention. According to certain embodiments of the present invention, the user profile may include a beverage preference list or a beverages recommendations list based on the beverage preference list. According to certain embodiments of the present invention, the beverage preference list could be complied based on past selections or determined from current user information. Thus, embodiments of the methods of the present invention may include providing any beverage chosen from a beverage preference list or a beverage recommendations list upon selection of the random choice or the blended beverage choice.

FIG. 1 illustrates an apparatus 10 made in accordance with an embodiment of the present invention. Examples of suitable beverage dispensers 10 for certain embodiments of the present invention include, but are not limited to, a post-mix dispenser, a vending machine dispenser, an in-store dispenser, and the like.

As shown, the apparatus 10 may comprise a plurality of separate storage containers 12 wherein two storage containers 12 may each comprise at least two beverage base ($B_1$, $B_2 \ldots B_N$, at least two storage containers 12 may comprise colorants ($C_1, C_2, \ldots C_N$), at least two storage containers 12 may comprise flavorants ($F_1, F_2, \ldots F_N$), and at least one storage container 12 may comprise an additive (A). In addition, the apparatus 10 may comprise a user interface 14, a dispenser nozzle 16, and a computer processor 18.

The colorant storage containers 12 ($C_1, C_2, \ldots C_N$) may each comprise a bag, a tank, a box, or any container suitable for storing colorants. The colorant storage containers 12 ($C_1, C_2, \ldots C_N$) may be positioned within the apparatus 10 itself as opposed to being remotely positioned in conventional bag in box containers or otherwise. Any other type of storage arrangements may also be used.

The flavorant storage containers 12 ($F_1, F_2, \ldots F_N$) may each comprise a bag, a tank, a box, or any container suitable for storing flavorants. The flavorant storage containers 12, ($F_1, F_2, \ldots F_N$) may be positioned within the apparatus 10 itself as opposed to being remotely positioned in conventional bag in box containers or otherwise. Any other type of storage arrangements may also be used.

Once a request for a beverage is made through the user interface 14, the contents of the necessary storage containers 12 may be dispensed automatically and continuously in a predetermined ratio for any volume of beverage dispensed to combine and ultimately provide the requested beverage accordingly. Any combination of a beverage base, colorants, flavorants, and/or additives, may be dispensed automatically in response to the selection to provide the selected beverage. For example, a user may request through the interface 14 a green, cherry-flavored diet soda. As shown, the storage container 12 comprising a beverage base ($B_1$) 12 may comprise carbonated soda and the storage container comprising the additive (A) 12 may comprise a non-caloric sweetener. At least one of the storage containers 12 comprising a colorant ($C_1$), may comprise a green colorant and at least one of the storage containers 12 comprising a flavorant ($F_1$), may comprise a cherry flavorant. At the request of such beverage, each of the appropriate storage containers 12 will dispense the necessary component to provide the requested beverage via the nozzle 16.

The ability to dispense the appropriate ingredients in the appropriate proportions for a given flow rate results from the use of individual pumps and/or metering devices for each of the beverage bases, colorants, flavorants, and/or additives. Thus, the apparatus 10 could further comprise a means, such as a pump (not shown) or metering device (not shown) that is connected with each storage container 12 to dispense the contents from within the storage containers 12. In certain embodiments, a control device (not shown) or computer processor 18 may control the pumps and metering devices. Pumps included in certain embodiments of the present invention may be any conventional pump suitable for dispensing from within the storage containers 12 including, but not limited to, solenoid pump, positive displacement pump, or the like. Positive displacement pumps provide portion control for the more highly concentrated components that may be stored in one of the storage containers 12. An example of a positive displacement pump is shown in commonly owned U.S. patent application Ser. No. 11/276,548, filed in the U.S. Patent Office on Mar. 6, 2006 and entitled "Pump System with Calibration Curve". In addition, the pumps and the metering devices may be in fluid communication with the dispensing nozzle 16.

According to certain embodiments of the present invention, the pumps and the metering devices may be pulsed on and off as desired to vary the flow rate. Such pulsing, for example, may ensure mixing of the ingredients. The beverage may be mixed at the dispensing nozzle 16 or anywhere downstream (e.g., back room, in-line, etc.) to combine the beverage base, colorant, flavorant, and/or additives. According to certain embodiments of the present invention, different flow rates and flow timing may be employed. For example, certain fluid streams may be added early, late, or certain fluid streams may be pulsed.

The dispensing nozzle 16 may be any dispensing nozzle capable of dispensing beverages from the apparatus 10 including, but not limited to, a multi-flavor dispensing valve which has the ability to mix a number of fluids at the same time. The nozzle 16 may be integrated within the apparatus 10 or may be separate and attached thereto. Examples of dispensing nozzles 16 that may be used herein are shown in commonly owned U.S. patent application Ser. No. 10/233,867 (U.S. Patent Publication No. US 2004/0040983 A1) entitled "Dispensing Nozzle" and commonly-owned U.S. patent application Ser. No. 11/276,551, filed in the U.S. Patent Office on Mar. 6, 2006 and entitled "Dispensing Nozzle Assembly". In particular embodiments wherein the dispensing nozzle 16 is a multi-flavor dispensing valve (not shown), the nozzle 16 may include a flow director (not shown) in fluid communication with some or all of the storage containers 12. In some embodiments, the nozzle 16 may further include a tertiary flow assembly (not shown) having multiple conduits (not shown) in fluid communication with some or all of the storage containers. In certain embodiments, the tertiary flow assembly may be placed adjacent to the flow director such that the flow of fluid from the flow director and the flow of fluid from the conduits are configured to intersect or be adjacent to one another. As a result of such placement, the contents of the storage containers can be mixed to form the selected beverage. The multiple conduits may have differing sizes and configurations in order to vary the flow rate. Suitable examples of a flow director and a tertiary flow assembly are illustrated in FIGS. 1. and 4 of U.S. patent application Ser. No. 11/276,551. Examples of dispensers and other dispensing nozzles suitable for use in embodiments of the present invention can be found in commonly owned U.S. patent application Ser. No. 11/276,550, filed in the U.S. Patent Office on Mar. 6, 2007 and entitled "Beverage Dispensing System".

According to certain embodiments of the present invention, the user interface 14 may include, but is not limited to, a user input means (not shown) such as a key pad, touch pad, a processor, a memory device, a controller, and the like to command the necessary storage containers to dispense the appropriate ingredients. According to certain embodiments of the present invention, the user interface 14 may be programmed such that the user can select from at least two beverages, a blended beverage, a random beverage, flavors, colors, and additives via the user input means. In addition to selecting a particular beverage, embodiments of the user interface 14 may also provide via the user input means the ability for the user to alter the concentrations and intensity of beverage components and size of beverages. In other embodiments, the user interface 14 may also provide automatic, pre-programmed selections wherein specific pre-programmed recipes or randomized recipes may be requested as an aspect of the selected product. In some embodiments, the user interface 14 is programmed such that the user can select from at least two beverages, at least two beverage components, a blended beverage, or a random beverage via the user input means and the user interface then manipulates other components of the apparatus 10, in accordance with recipes or other beverage parameters stored in the interface, to continuously deliver the appropriate beverage components in accordance with the user's selection in a predetermined ratio for any volume of the beverage dispensed. Thus, in such embodiments, the user can alter the ingredients of the beverage. In some embodiments, the user can also alter the intensity of the beverage or additives to taste. As such, the user can submit an entire "recipe" for a beverage in some embodiments of the present invention. According to certain embodiments of the present invention, the apparatus 10 thus provides the user with the ability to create and blend numerous types of beverages as desired by altering the ingredients the beverage to taste.

According to certain embodiments of the present invention, the user interface 14 may also include, but is not limited to, a wireless signal receiver (not shown) and/or a wireless signal transmitter (not shown) so that the user can communicate with the user interface wirelessly to request a selected beverage having a selected color and/or flavor. Additionally, particular embodiments of the user interface 14 may include a card reader (not shown) including, but not limited to a prepaid card reader, a credit card reader, a debit card reader, a smart card reader, or the like to allow the user to purchase a beverage using various methods that are alternative to cash. Also, some embodiments of the user interface 14 may include a parental control device to prevent an unwanted selection.

Figure 2:
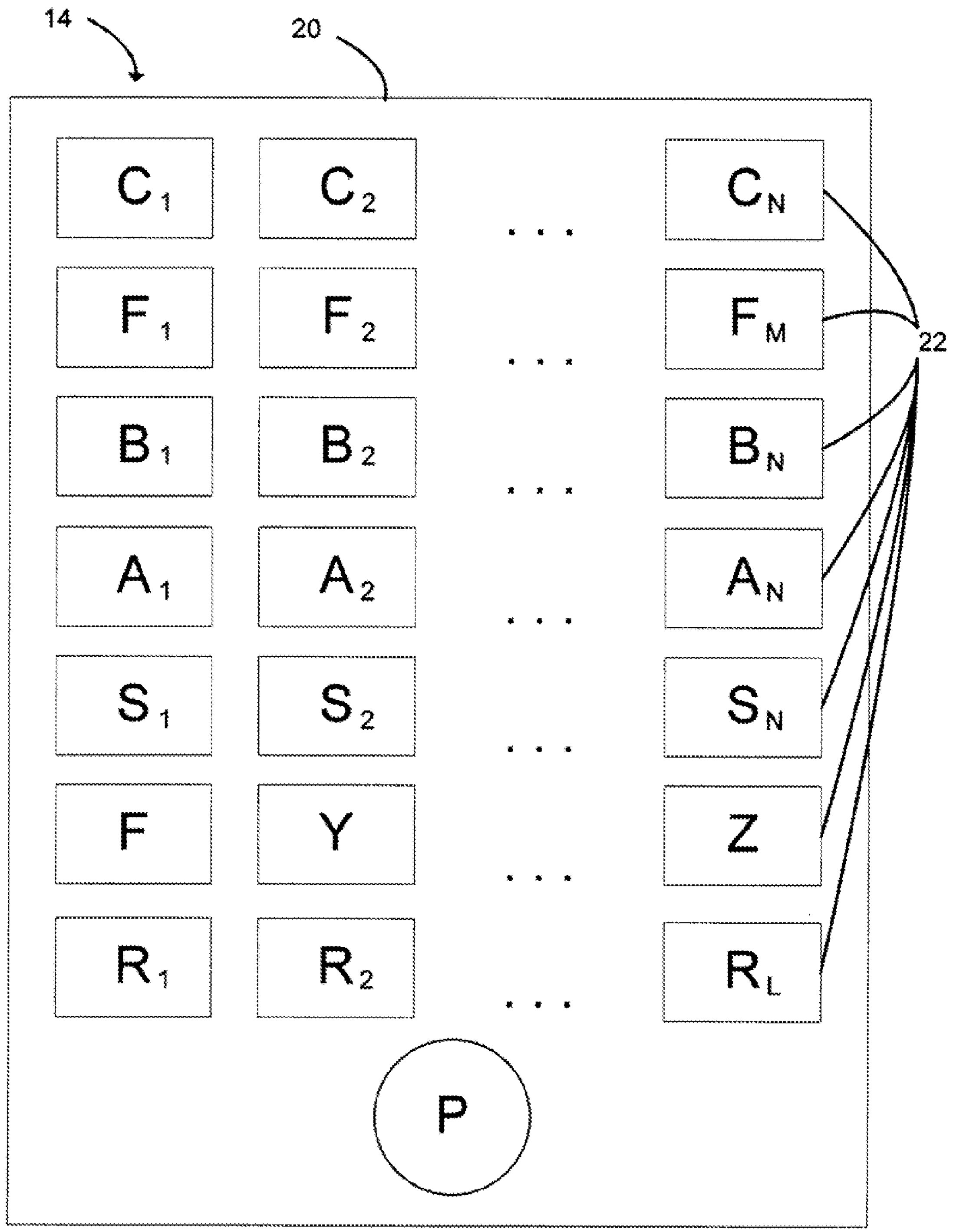
FIG. 2 is a schematic illustration of a user input means for selecting a beverage product having a separately selectable beverage color and a separately selectable beverage flavor, a blended beverage, and a randomly selected beverage in accordance with an embodiment of the present invention.

FIG. 2 illustrates a user interface 14 comprising a user input means 20 used for selecting a beverage in accordance with an embodiment of the present invention. The user input means 20 may be a key pad having various buttons 22 corresponding to the various components and options for the selected product. Accordingly, as shown, the first row of buttons may correspond to the colorants ($C_1, C_2, \ldots, C_N$); the second row of buttons may correspond to the flavorants ($F_1, F_2, \ldots, F_N$); the third row of buttons may correspond to the beverages ($B_1, B_2, \ldots B_N$); the fourth row of buttons may correspond to the additives ($A_1, A_2, \ldots A_N$); the fifth row of buttons may correspond to the sizes ($S_1, S_2, \ldots S_N$); the sixth row of buttons may correspond to other various options such as flow rate (F), a blended beverage (Y), or a randomizing program (Z); the seventh row of buttons may correspond to pre-programmed recipes ($R_1, R_2, \ldots R_L$) (e.g., branded beverages), and lastly there may be a button to finally dispense (P) the beverage once all the selections have been made. In one embodiment, selection of the blended beverage choice may allow selection of the beverages to be blended from the buttons available, for instance from the buttons corresponding to the beverages ($B_1, B_2, \ldots B_N$) and the pre-programmed recipes ($R_1, R_2, \ldots R_L$).

It should be understood that alternate embodiments may include less buttons, omitted types of buttons, more buttons, and buttons for different functions, for example, buttons for canceling a selection or for displaying nutritional information. For example, in alternate embodiments the user input means 20 may be a touch screen panel (not shown) comprising an intensity indicator such as a color spectrum indicating the intensity or hue of the color selected from the touch screen color spectrum. In one embodiment, selection of the blended beverage choice may result in a change in the screen of a touch screen panel such that only the beverages to be blended are displayed.

According to alternate embodiments, the user input means 20 may also include a display (not shown) or communication means (not shown), including, but not limited to, an light emitting diode (LED) display, a graphical interface, or a communication device to display information such as dispenser statistics or communicate to the user information such as troubleshooting. For example, there may be LED displays or lights which communicate to the user suggested additives for the selected beverage. Additionally, in some embodiments, the display may reveal the components of a pre-programmed recipe or of a randomizing program.

As stated earlier, the interface 14 may comprise a user input means 20 wherein the user input means is a key pad having various buttons 22. There may be at least one button 22 corresponding to size indicating a pre-programmed size ($S_1, S_2, \ldots S_N$) of the beverage being dispensed from the apparatus 10. According to certain embodiments of the present invention, the actual and relative volumes of beverage dispensed may be adjusted or set accordingly. There may be at least one button 22 corresponding to the flow rate (F) providing the option of a continuous flow rather than a pre-programmed volume. Once the desired selections have been made, the user can select the button 22 to dispense (P) the selected beverage having the selected beverage components. Accordingly, there may also be other buttons 22 in alternate embodiments that provide additional elements not provided herein. Further detail regarding operation or the apparatus 10 and user input means 20 is described in commonly owned U.S. patent application Ser. No. 11/276,553, filed in the U.S. Patent Office on Mar. 6, 2007 and entitled "Methods and Apparatuses for Making Compositions Comprising an Acid and an Acid Degradable Component and/or Compositions Comprising a Plurality of Selectable Components".

Embodiments of the present invention provide for methods and apparatuses for providing beverages having selected colors and/or flavors, blended beverages, and a random beverage wherein the selection may be made by an individual selection, pre-programmed selections, randomized selections, or combinations thereof. Accordingly, embodiments of the present invention provide for a vast array of options that will allow manufacturers and users alike to enjoy the benefits of promotional products, novelty products and the like wherein such options were not previously available.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

It should be understood that the foregoing relates to particular embodiments of the present invention, and that numerous changes may be made therein without departing from the scope of the invention as defined from the following claims.

I claim:

1. A method for providing a beverage having a separately selected color from a post-mix beverage dispensing system comprising:

a. providing at least two substantially colorless beverage bases for dispense from the post-mix beverage dispensing system;

b. separately storing at least two colorants in the post-mix beverage dispensing system;

c. receiving a request for a selected beverage base and the separately selected color with a computer processor; and d. in response to the selection of the selected beverage base and the separately selected color, automatically dispensing through a dispenser, in a predetermined ratio for any volume of the beverage dispensed, the selected beverage base and at least one of the colorants to provide the beverage having the separately selected color.

2. The method of claim 1, wherein the separately selected color is selected from a range of colors that can be produced by combining the at least two colorants in various proportions.

3. The method of claim 1, wherein the separately selected color comprises a separately selected color having a separately selected intensity, separately selected saturation, or separately selected brightness.

4. The method of claim 1, wherein the separately selected color is selected by an automated program.

5. The method of claim 4, wherein the automated program is a pre-programmed recipe, a randomizing program, or a combination thereof.

6. The method of claim 1, further comprising:

e. separately storing at least one additive in the post-mix beverage dispensing system;

f. receiving a request for at least one selected additive with the computer processor; and g. in response to the selection of the selected beverage base, the separately selected color, and the at least one selected additive, automatically dispensing through the dispenser of the post-mix beverage dispensing system in a predetermined ratio for any volume of the beverage dispensed, the selected beverage base, at least one of the colorants, and the at least one selected additive to provide the beverage having the separately selected color and the at least one selected additive.

7. The method of claim 1, wherein the step of providing the at least two substantially colorless beverage bases comprises separately storing in the post-mix beverage dispensing system at least two beverage base components for forming the substantially colorless beverage bases, and wherein the step of automatically dispensing comprises automatically dispensing through the dispenser, in a predetermined ratio for any volume of the beverage dispensed, at least two of the beverage base components and at least one of the colorants to provide the beverage having the separately selected color.

8. The method of claim 7, wherein the beverage base components are selected from the group consisting of water, carbonated water, sweeteners, thickeners, dairy products, soy products, fruit products, vegetable products, food products, and combinations thereof.

9. A post-mix beverage dispensing system for providing a beverage having a separately selected color, the post-mix beverage dispensing system comprising:

a. at least two sources for providing at least two substantially colorless beverage bases for dispense from the post-mix beverage dispensing system;

b. at least two colorant storage containers for separately storing at least two colorants in the post-mix beverage dispensing system;

c. a computer processor for receiving a request for a selected beverage base and the separately selected color; and d. a dispenser for automatically dispensing, in a predetermined ratio for any volume of the beverage dispensed, in response to the selection of the selected beverage base and the separately selected color, the selected beverage base and at least one of the colorants to provide the beverage having the separately selected color.

10. The post-mix beverage dispensing system of claim 9, wherein the separately selected color is selected from a range of colors that can be produced by combining the at least two colorants in various proportions.

11. The post-mix beverage dispensing system of claim 9, wherein the separately selected color comprises a separately selected color having a separately selected intensity, separately selected saturation, or separately selected brightness.

12. The post-mix beverage dispensing system of claim 9, wherein the separately selected color is selected by an automated program.

13. The post-mix beverage dispensing system of claim 12, wherein the automated program is a pre-programmed recipe, a randomizing program, or a combination thereof.

14. The post-mix beverage dispensing system of claim 9 further comprising:

e. at least one additive storage container for separately storing at least one additive, wherein the computer processor is adapted to receive a request for at least one selected additive, and wherein the dispenser is adapted to automatically dispense, in a predetermined ratio for any volume of the beverage dispensed, in response to the selection of the selected beverage base, the separately selected color, and the at least one selected additive, the selected beverage base, at least one of the colorants, and the at least one selected additive to provide the beverage having the separately selected color and the at least one selected additive.

15. The post-mix beverage dispensing system of claim 9, wherein the sources comprise at least two storage containers for separately storing at least two beverage base components for forming the at least two substantially colorless beverage bases, and wherein the dispenser is adapted to automatically dispense, in a predetermined ratio for any volume of beverage dispensed, at least two of the beverage base components and at least one of the colorants to provide the beverage having the separately selected color.

16. The method of claim 15, wherein the beverage base components are selected from the group consisting of water, carbonated water, sweeteners, high fructose corn syrup, thickeners, dairy products, soy products, fruit products, vegetable products, food products, and combinations thereof.

17. A method for providing a beverage having a separately selected color from a post-mix beverage dispensing system comprising:

a. providing at least one uncolored beverage base for dispense from the post-mix beverage dispensing system;

b. separately storing at least one colorant in the post-mix beverage dispensing system;

c. receiving a request for a selected beverage base and the separately selected color with a computer processor; and d. in response to the selection of the selected beverage base and the separately selected color, automatically dispensing through a dispenser the selected beverage base and at least one of the at least one colorant to provide the beverage having the separately selected color.

18. The method of claim 17, wherein the separately selected color is selected from a range of colors that can be produced by providing the at least one colorant in various proportions.

19. The method of claim 17, wherein the separately selected color comprises a separately selected color having a separately selected intensity, separately selected saturation, or separately selected brightness.

20. The method of claim 17, wherein the separately selected color is selected by an automated program.

21. The method of claim 20, wherein the automated program is a pre-programmed recipe, a randomizing program, or a combination thereof.

22. The method of claim 17, further comprising:

e. separately storing at least one additive in the post-mix beverage dispensing system;

f. receiving a request for at least one selected additive with the computer processor; and g. in response to the selection of the selected beverage base, the separately selected color, and the at least one selected additive, automatically dispensing through the dispenser of the post-mix beverage dispensing system, the selected beverage base, at least one of the at least one colorant, and the at least one selected additive to provide the beverage having the separately selected color and the at least one selected additive.

23. The method of claim 17, wherein the step of providing the at least one uncolored beverage base comprises separately storing in the post-mix beverage dispensing system at least one beverage base component for forming the at least one uncolored beverage base, and wherein the step of automatically dispensing comprises automatically dispensing at least one of the at least one beverage base component and at least one of the at least one colorant to provide the beverage having the separately selected color.

24. The method of claim 23, wherein the at least one beverage base component is selected from the group consisting of water, carbonated water, sweeteners, thickeners, dairy products, soy products, fruit products, vegetable products, food products, and combinations thereof.

25. A post-mix beverage dispensing system for providing a beverage having a separately selected color, the post-mix beverage dispensing system comprising:

a. at least one source for providing at least one uncolored beverage base for dispense from the post-mix beverage dispensing system;

b. at least one colorant storage container for separately storing at least one colorant in the post-mix beverage dispensing system;

c. a computer processor for receiving a request for a selected beverage base and the separately selected color; and d. a dispenser for automatically dispensing, in response to the selection of the selected beverage base and the separately selected color, the selected beverage base and at least one of the at least one colorant to provide the beverage having the separately selected color.

26. The post-mix beverage dispensing system of claim 25, wherein the separately selected color is selected from a range of colors that can be produced by providing the at least one colorant in various proportions.

27. The post-mix beverage dispensing system of claim 25, wherein the separately selected color comprises a separately selected color having a separately selected intensity, separately selected saturation, or separately selected brightness.

28. The post-mix beverage dispensing system of claim 25, wherein the separately selected color is selected by an automated program.

29. The post-mix beverage dispensing system of claim 28, wherein the automated program is a pre-programmed recipe, a randomizing program, or a combination thereof.

30. The post-mix beverage dispensing system of claim 25 further comprising:

e. at least one additive storage container for separately storing at least one additive, wherein the computer processor is adapted to receive a request for at least one selected additive, and wherein the dispenser is adapted to automatically dispense, in response to the selection of the selected beverage base, the separately selected color, and the at least one selected additive, the selected beverage base, at least one of the at least one colorant, and the at least one selected additive to provide the beverage having the separately selected color and the at least one selected additive.

31. The post-mix beverage dispensing system of claim 25, wherein the source comprises at least one storage container for separately storing at least one beverage base component for forming the at least one uncolored beverage base, and wherein the dispenser is adapted to automatically dispense, at least one of the at least one beverage base component and at least one of the at least one colorant to provide the beverage having the separately selected color.

32. The method of claim 31, wherein the at least one beverage base component is selected from the group consisting of water, carbonated water, sweeteners, high fructose corn syrup, thickeners, dairy products, soy products, fruit products, vegetable products, food products, and combinations thereof.

* * * * *